(12) United States Patent
Sempel et al.

(10) Patent No.: US 9,748,801 B2
(45) Date of Patent: Aug. 29, 2017

(54) SYSTEM FOR CAPACITIVELY DRIVING A LOAD

(71) Applicant: KONINKLIJKE PHILIPS N.V., Eindhoven (NL)

(72) Inventors: Adrianus Sempel, Waalre (NL); Theodorus Johannes Petrus Van Den Biggelaar, Veldhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/027,693

(22) PCT Filed: Oct. 9, 2014

(86) PCT No.: PCT/EP2014/071591
§ 371 (c)(1),
(2) Date: Apr. 6, 2016

(87) PCT Pub. No.: WO2015/052263
PCT Pub. Date: Apr. 16, 2015

(65) Prior Publication Data
US 2016/0248274 A1 Aug. 25, 2016

(30) Foreign Application Priority Data
Oct. 9, 2013 (EP) .................................... 13187953

(51) Int. Cl.
*H05B 33/08* (2006.01)
*H02J 50/05* (2016.01)
(Continued)

(52) U.S. Cl.
CPC ................ *H02J 50/05* (2016.02); *H02J 5/00* (2013.01); *H02J 7/025* (2013.01); *H05B 33/083* (2013.01);
(Continued)

(58) Field of Classification Search
CPC .............. H05B 33/0815; H05B 33/083; H05B 33/0842; H02J 5/00; H02J 7/025
(Continued)

(56) References Cited

U.S. PATENT DOCUMENTS 3,273,046 A * 9/1966 Bedford .............. H02M 7/5152
327/472
2004/0012336 A1 1/2004 Okuda
(Continued)

FOREIGN PATENT DOCUMENTS

WO 0231406 A1 3/2012
WO 2012120404 A1 9/2012

*Primary Examiner* — Douglas W Owens
*Assistant Examiner* — Syed M Kaiser

(57) ABSTRACT

A capacitive driving system (100) comprises:
a supply device (10) comprising a power generator (13), capacitive transmission electrodes (11, 12) and preferably at least one inductor (16) connected in series between the power generator and at least one of said transmission electrodes;
at least one load device (20) comprising two capacitive receiver electrodes (21, 22) and at least one load member (23) coupled to said receiver electrodes.
For resonant energy transfer, the supply device and the load device have an energy transfer position in which a first one of said transmission electrodes together with a first one of said receiver electrodes defines a first transfer capacitor (31) while simultaneously a second one of said transmission electrodes together with a second one of said receiver electrodes defines a second transfer capacitor (32). At least one auxiliary capacitor (111; 112; 121; 122) is connected in series with inductor and load.

12 Claims, 5 Drawing Sheets

(51) Int. Cl.
*H02J 5/00* (2016.01)
*H02J 7/02* (2016.01)

(52) U.S. Cl.
CPC ..... *H05B 33/0815* (2013.01); *H05B 33/0842* (2013.01)

(58) Field of Classification Search
USPC ...................................... 315/185 R; 307/109
See application file for complete search history.

(56) References Cited

U.S. PATENT DOCUMENTS

| | | |
|---|---|---|
| 2006/0006810 A1 | 1/2006 | Verdun |
| 2006/0077132 A1* | 4/2006 | Ploquin ................ G09G 3/2965 345/68 |
| 2009/0302690 A1* | 12/2009 | Kubono .................. H02J 17/00 307/109 |
| 2011/0084624 A1 | 4/2011 | Dekker et al. |
| 2012/0049640 A1 | 3/2012 | Ichikawa et al. |
| 2012/0091819 A1 | 4/2012 | Kulikowski et al. |
| 2012/0248882 A1 | 10/2012 | Urano |
| 2012/0299392 A1 | 11/2012 | Ichikawa et al. |
| 2013/0088092 A1* | 4/2013 | Ladron de Guevara ............. H02M 1/4266 307/109 |

* cited by examiner

SYSTEM FOR CAPACITIVELY DRIVING A LOAD

CROSS-REFERENCE TO PRIOR APPLICATIONS

This application is the U.S. National Phase application under 35 U.S.C. §371 of International Application No. PCT/EP2014/071591, filed on Oct. 9, 2014, which claims the benefit of European Patent Application No. 13187953.8, filed on Oct. 9, 2013. These applications are hereby incorporated by reference herein.

FIELD OF THE INVENTION

The present invention relates in general to the field of wireless power transfer to a load device. In a particular embodiment, the load device is a lighting device including one or more light-generating units. In another example, the transfer involves the charging of a battery of an appliance, for instance a telephone. The invention will be specifically explained for these examples without intending to limit the scope of the invention to these examples.

BACKGROUND OF THE INVENTION

Traditionally, electric power from a source to a load is transferred via wires, which obviously requires that the load device is connected to the source via wires. The desire to be able to move the load device leads to the solution of having connectors in the wires, such connectors making mechanical (Ohmic) contact. There are however examples where it is desirable to move the load device often, in which case the need to often connect/disconnect such connector becomes a burden. Practical examples include electric toothbrushes, telephones, and also lamps. To meet such desire, wireless power transfer has been developed. In such devices, connectors involve an inductive or a capacitive coupling. Typically, one of the coupling components is arranged within or attached to the housing of the load device itself. For instance, in the case of inductive coupling, the housing of the load device may contain a receiver coil, which for power transfer will be coupled to a transmission coil in a docking station, the two coupled coils basically constitute a transformer. In the case of capacitive coupling, the load device will include at least one receiver electrode which for power transfer will be coupled capacitively to a transmission electrode in a supply structure such as for instance a docking station. Such receiver electrode and transmission electrode are usually implemented as a plate, and when coupled they together define a capacitor.

FIG. 1 is a block diagram schematically illustrating a capacitive driving system 1, comprising a supply device 10 and a separate load device 20. The supply device 10 comprises two plate-shaped transmission electrodes 11, 12, which can be considered as output terminals. The supply device 10 further comprises a power generator 13 for generating AC power. A first output terminal 14 of the supply device 10 is connected to a first one 11 of the transmission electrodes, while a second output terminal 15 of the supply device 10 is connected to a second one 12 of the transmission electrodes. At least one inductor 16 is connected in series between the supply device 10 and the transmission electrodes 11, 12. The load device 20 comprises at least one load member 23 connected in series in between a first plate-shaped receiver electrode 21 and a second plate-shaped receiver electrode 22. The load member 23 is depicted as a resistor, and may ideally have ohmic characteristics. The transmission electrodes 11, 12 are located close to an outer surface of the supply device 10, and the receiver electrodes 21, 22 are located close to an outer surface of the load device 20. The disposition of the receiver electrodes 21, 22 matches the disposition of the transmission electrodes 11, 12, so that the load device 20 and the supply device 10 can be placed in close proximity of each other in an energy transfer position in which the first transmission electrode 11 together with the first receiver electrode 21 defines a first transfer capacitor 31 while simultaneously the second transmission electrode 12 together with the second receiver electrode 22 defines a second transfer capacitor 32.

The inductor 16 together with the capacitors 31 and 32 define a resonance circuit having a resonance frequency, and the power generator 13 is designed to generate an AC output signal at said resonance frequency, so that the circuit operates in resonance and power is efficiently transferred from the power generator 13 to the load member 23.

There are applications where the load device 20 is mounted to the supply device 10 once, and there are applications where the load device 20 is connected to and disconnected from the supply device 10 frequently. In any case, there exists a problem that the precise actual capacitance value of the transfer capacitors 31, 32 depends on the circumstances of the precise actual placement of the load device 20. A displacement of the load device 20 with respect to the supply device 10, or the accidental presence of pieces of dirt between the contacts, or, in cases where an additional dielectric contact liquid is applied, variations in the properties of the dielectric, will result in variation of the actual capacitance value of the transfer capacitors 31, 32, which in turn will result in variation of the actual resonance frequency and thus, since the power generator 13 is set to operate at the design resonance frequency, a variation in the power transferred to the load member 23.

Such variation is undesirable, with the level of inconvenience depending on the situation. In the case of a charger of an appliance, charging to the required level can take longer than expected, or the batteries are charged insufficiently and will be exhausted before this is expected. In case multiple mutually identical loads are driven in parallel, the loads receive different amounts of power. In the case of a lighting system having multiple lighting units driven in parallel, the respective lighting units produce mutually different output light levels, which is clearly visible to an observer.

For the developer and manufacturer of the driving system, such possible variations mean that there is uncertainty about the actual capacitance value of the transfer capacitors 31, 32, even if all components have been manufactured with great precision. If the manufacturer wishes to avoid the above-mentioned problems, adaptations to the power generator are needed.

US 2009/302690 A1 discloses a power transmission system that includes a power supplying apparatus and a power receiving apparatus. The power supplying apparatus comprises a power generator, a first resonance unit and power supplying electrodes. The first resonance unit comprises an induction component and/or a capacitance component and resonates the power signal, which resonated power signal is externally radiated by the power supplying electrodes. The power receiving apparatus comprises power receiving electrodes for receiving the radiated power signal and a second resonance unit that has an induction component and/or a capacitance component. The power supplying electrodes and the power receiving electrodes define transfer capacitors. To transmit power more efficiently by relaxing constraints on spatial relationships the power transmission system is provided with a control unit. The control unit controls the induction component and/or a capacitance component of the first or the second resonance unit based on the power value measured by the power measurement unit. This is a rather complicated way to compensate for spatial or placement deviations.

SUMMARY OF THE INVENTION

A general objective of the present invention is to eliminate or at least reduce the above-mentioned problems.

According to an important aspect of the present invention, at least one auxiliary capacitor is included in series with the transfer capacitors, either included in the supply device or in the load device, or both. The auxiliary capacitor is preferably designed to have a lower capacitance value than the optimum design capacitance of the transfer capacitors, and is preferably manufactured to a precision better than the expected variation of the transfer capacitors. Consequently, the resonance properties of the system are primarily determined by the auxiliary capacitor, so that the accuracy of the system as a whole has improved.

Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
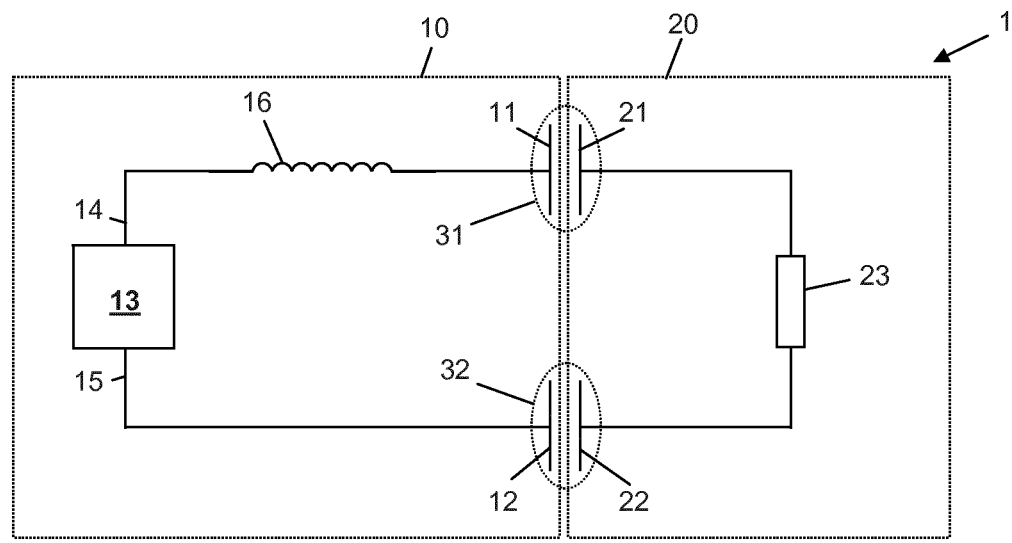
FIG. 1 is a block diagram schematically illustrating a capacitive driving system.
Figure 2:
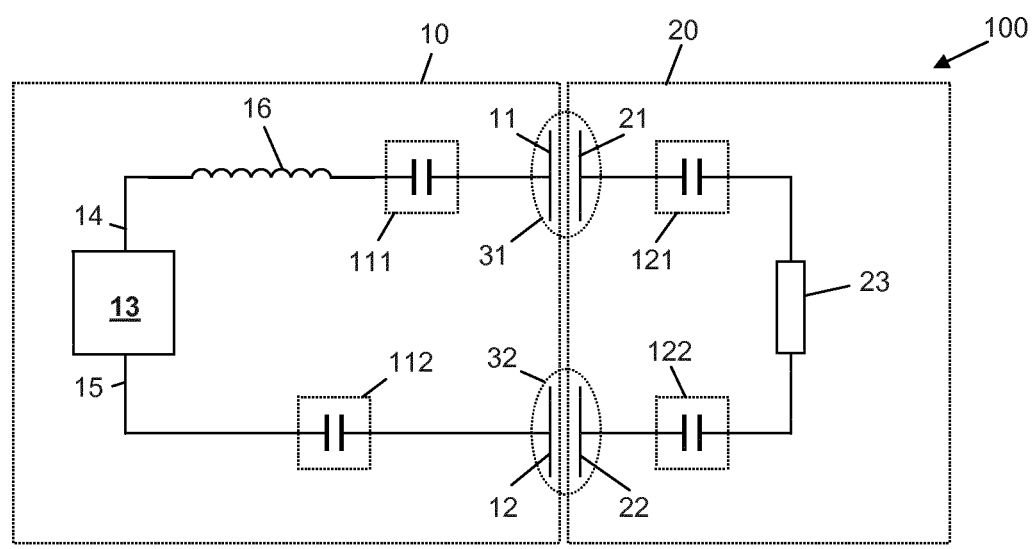
FIG. 2 is a block diagram schematically illustrating a capacitive driving system.

FIG. 2 is a block diagram comparable to FIG. 1, of a capacitive driving system 100 illustrating the basic principle underlying the present invention. The figure shows four possible locations for an auxiliary capacitor included in series with the transfer capacitors 31, 32. A first auxiliary capacitor 111 is shown at a first possible location in the supply device 10, in series with the first transmission electrode 11 and the inductor 16. A second auxiliary capacitor 112 is shown at a second possible location in the supply device 10, in series with the generator's opposite output 15 and the second transmission electrode 12. A third auxiliary capacitor 121 is shown at a first possible location in the load device 20, in between the load 23 and the first receiver electrode 21. A fourth auxiliary capacitor 122 is shown at a second possible location in the load device 20, in between the load 23 and the second receiver electrode 22. It should be clear that, in each and every one of the above examples, in the resonant circuit going from the first output terminal 14 of the supply device 10 to the opposite output terminal. The auxiliary capacitor concerned is arranged in series with the transfer capacitances. The invention can be implemented with any one of the auxiliary capacitors shown, but it is also possible to have a combination with two (or more) auxiliary capacitors in the supply device 10, two (or more) auxiliary capacitors in the load device 20, at one side or at opposite sides of the load, or one (or more) auxiliary capacitors in the supply device 10 and one (or more) auxiliary capacitors in the load device 20.

For explaining the invention, the following calculation is given.

Assume that the transfer capacitors 31, 32 each have a design capacitance C1 and a variation Δ1, meaning that this capacitance can range from (1−Δ1)·C1 to (1+Δ1)·C1. Assume one auxiliary capacitor 121 in series with the load, having a design capacitance Ca and a variation Δa.

Assume Ca/C1=x, with x<1.

Assume Δa/Δ1=y, with y<1.

It will be seen that the overall capacitance Ct of the circuit can be written as $$\frac{1}{Ct} = \frac{1}{C1} + \frac{1}{C1} + \frac{1}{Ca} = \frac{2Ca}{C1 \cdot Ca} + \frac{C1}{C1 \cdot Ca}$$

$$\Rightarrow C1 \cdot Ca = Ct \cdot (2Ca + C1)$$

$$\Rightarrow Ct = \frac{C1 \cdot Ca}{2Ca + C1} = Ca \cdot \frac{1}{1 + 2\frac{Ca}{C1}} \approx Ca \cdot (1 - 2x)$$

The smaller the ratio x, the more accurate the above approximation is. In practice, x can easily be smaller than 0.01.

From the same equation, it can be seen that the variation in the overall capacitance Ct is primarily determined by the variation Δa of the auxiliary capacitor. Consequently, the resonance frequency of the system is now more accurate, and is less sensitive to variations in the capacitance of the transfer capacitors 31, 32.

Figure 3:
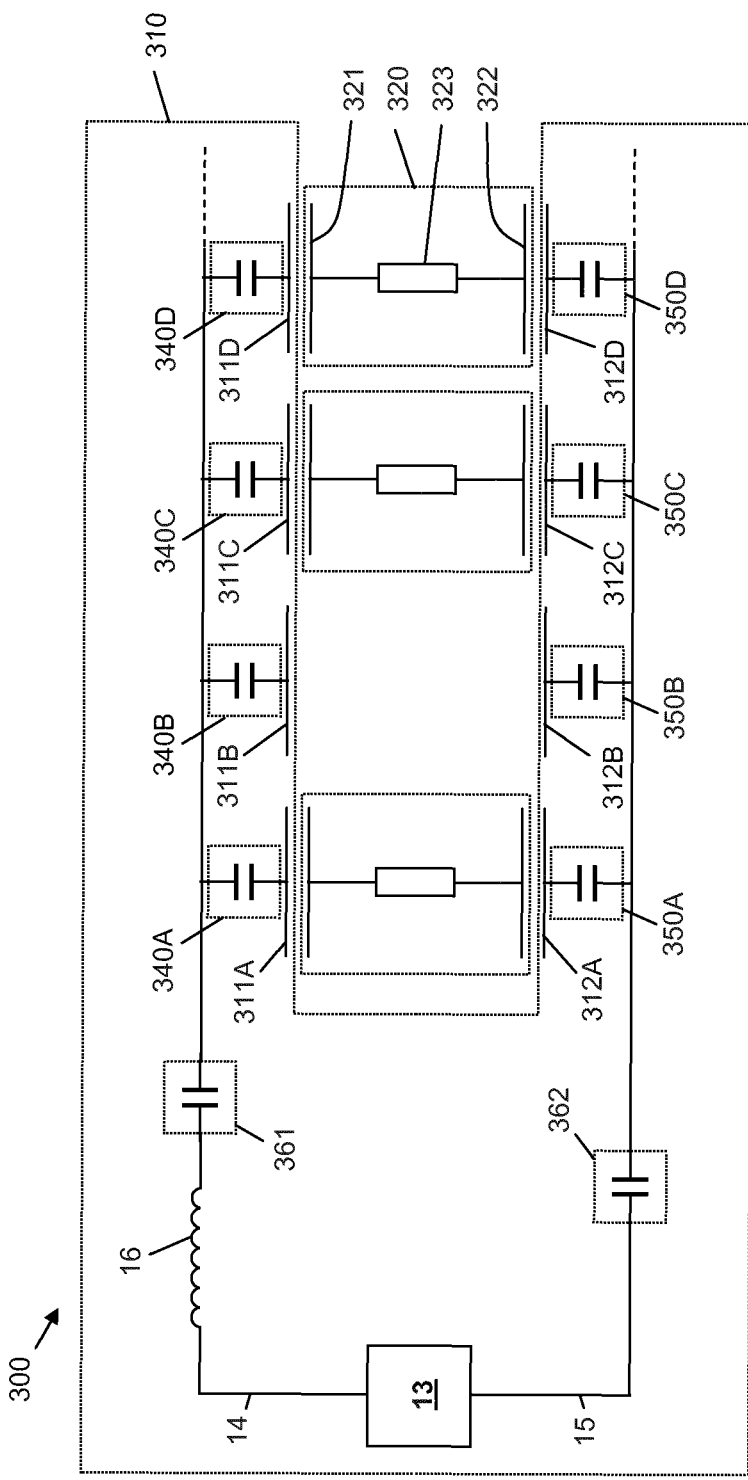
FIG. 3 is a block diagram schematically illustrating a capacitive driving system for driving multiple loads.

FIG. 3 is a block diagram of a capacitive driving system 300 adapted for driving multiple loads. The supply device, now indicated by reference numeral 310, has multiple sets of transmission electrodes 311, 312. In FIG. 3, four such sets are shown, but the number of sets may be higher or lower than four. Each set of electrodes is capable of coupling to a load device 320, always comprising a load member 323 in series with receiver electrodes 321, 322. In FIG. 3, only three load devices are shown. In the following, if it is intended to distinguish individual load devices and corresponding electrodes, characters A, B, C etc. will be added to the reference numerals.

The supply device 310 can accommodate any number of load devices up to a certain maximum number. It is not necessary that all transmission electrodes are occupied. In FIG. 3, transmission electrodes 311B, 312B are free.

According to the invention, respective auxiliary capacitors 340 are arranged in series with the respective transmission electrodes 311. It is noted that such auxiliary capacitors 350 may, additionally or alternatively, also be arranged in series with the respective opposite transmission electrodes 312, as shown.

The auxiliary capacitors 340 and/or 350 are auxiliary capacitors dedicated to individual transmission electrodes. FIG. 3 further shows that it is also possible to have, additionally or alternatively, one or more common auxiliary capacitors 361, 362 in series with one or more of the output terminals 14, 15 of the power generator 13.

Figure 4:
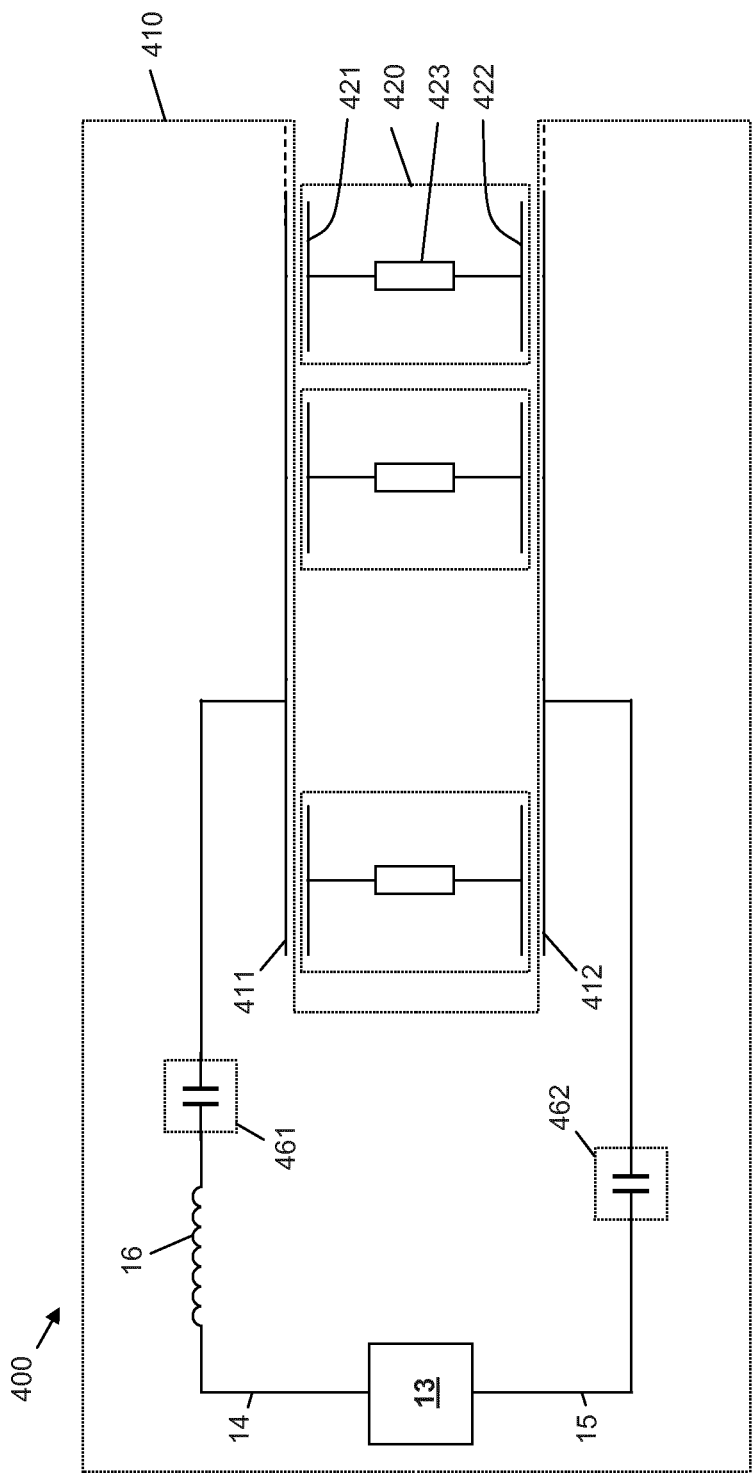
FIG. 4 is a block diagram schematically illustrating a capacitive driving system for driving multiple loads.

It is noted that it is not necessary that the various transmission electrodes are actually discrete electrodes: it is for instance possible that the transmission electrodes are implemented as continuous strips 411, 412, allowing one or more load devices, now indicated by reference numeral 420, to be coupled to any surface portion of such relatively large-surface electrode. Such system 400 is schematically illustrated in FIG. 4. In this case, the supply device 410 has one common auxiliary capacitor 461 in series with the inductance 16 and/or one common auxiliary capacitor 462 in series with the opposite output terminal 15 of the power generator 13.

In the driving systems 300, 400 of FIGS. 3 and 4, the auxiliary capacitor(s) is/are arranged in the supply device 310, 410. Such system 300, 400 is particularly useful in cases where one or more users can add one or more load devices as desired. Exemplary embodiments of such systems are: a charging system for mobile devices such as telephones, PDAs, laptops, etc; an illumination system where lamp units can be added and placed as desired. By implementing the auxiliary capacitor(s) in the supply unit, it is not necessary to adapt the users' load devices. Although in such case the resonance frequency of the system as a whole is determined more accurately, the coupling capacities of the respective individual loads, however, may still vary widely so that the power distribution between the individual loads may vary.

Figure 5A:
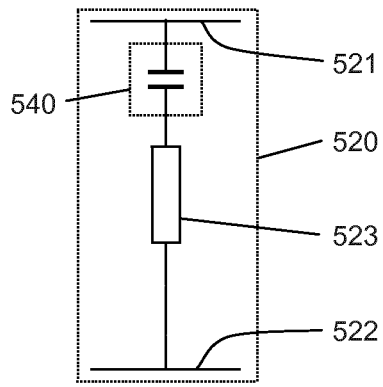
FIGS. 5A and 5B are block diagrams schematically illustrating examples of a load device capable of being capacitively driven.
Figure 5B:
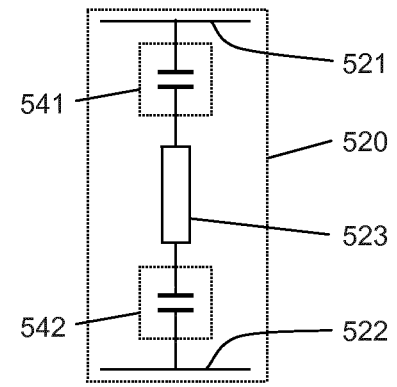

In another approach, it is possible to adapt a load device for cooperation with a capacitive supply device that does not need to be adapted. Such solution is particularly useful in cases where it is undesirable or even impossible to adapt the supply device, for instance in the case of an existing supply device. An example of such load device 520 according to the present invention is schematically illustrated in FIG. 5A. Again, the load device 520 comprises a load member 523 connected in series between two plate-shaped receiver electrodes 521, 522. A small auxiliary capacitor 540 is connected in series with the load 523. In a symmetric device, two such small auxiliary capacitors 541, 542 can be arranged at opposite sides of the load member 523, as shown in FIG. 5B. This load device 520 can be used in cooperation with a supply device 10 of FIG. 1.

Figure 6A:
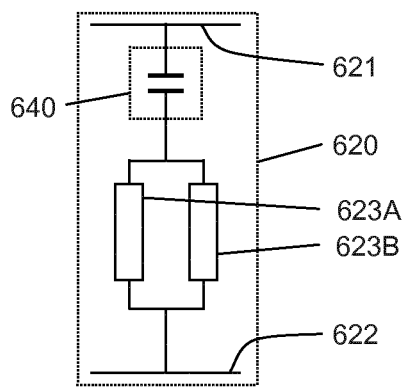
FIGS. 6A and 6B are block diagrams schematically illustrating other examples of a load device capable of being capacitively driven.
Figure 6B:
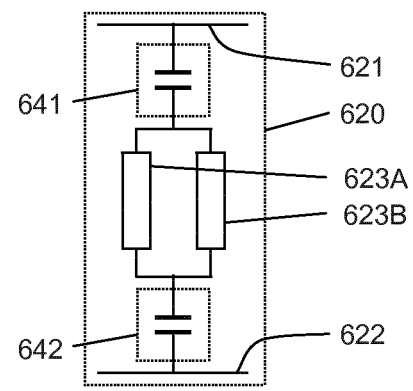

FIG. 6A shows an embodiment of a load device 620 according to the present invention, comprising two loads 623A and 623B connected in parallel, this parallel circuit being connected in series between two plate-shaped receiver electrodes 621, 622. A small common auxiliary capacitor 640 is connected in series with the parallel arrangement of loads 623A and 623B. In a symmetric device, two such small auxiliary capacitors 641, 642 can be arranged in series at opposite sides of said parallel circuit of load members 623A, 623B, as shown in FIG. 6B. It is noted that said parallel circuit may comprise more than two load members connected in parallel, with always one or more common auxiliary capacitor(s) connected in series with the parallel circuit.

Figure 7:
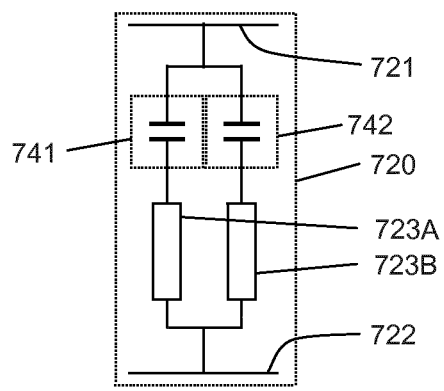
FIG. 7 is a block diagram schematically illustrating another example of a load device capable of being capacitively driven.

FIG. 7 shows an embodiment of a load device 720 according to the present invention, comprising two load members 723A and 723B connected in parallel, this parallel circuit being connected in series between two plate-shaped receiver electrodes 721, 722. In this embodiment, small dedicated auxiliary capacitors 741 and 742 are connected in series with the respective load members 723A and 723B. It is noted that the load device may have more than two loads connected in parallel, each load provided with its own dedicated auxiliary capacitor—in series. In a symmetric device, each load member may be connected in series to two auxiliary capacitors at opposite sides, but this is not shown for sake of simplicity.

It is noted that a combination of dedicated auxiliary capacitors and common auxiliary capacitor is also possible.

Figure 8:
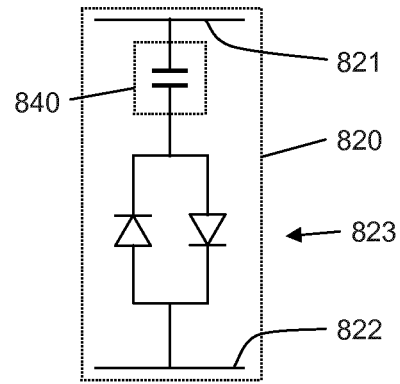
FIG. 8 is a block diagram schematically illustrating another example of a load device capable of being capacitively driven.

FIG. 8 shows an embodiment of a load device 820 according to the present invention, where the load device is an illumination device and comprises a load 823 of two (or more) strings of LEDs connected in series between two plate-shaped receiver electrodes 821, 822, each string comprising one or more LEDs, and the two strings being arranged anti-parallel to each other. Comparable to FIG. 6, the strings have one common auxiliary capacitor 840, but it is also possible to have individual dedicated auxiliary capacitor per LED string, comparable to FIG. 7.

For manufacturing an accurate capacitance for the purposes of the present invention, it is useful to turn to semiconductor technology. Methods for manufacturing a capacitance in an integrated circuit are known per se. This is particularly useful in case the load device is an illumination device and comprises a plurality of LEDs. These LEDs may be manufactured in one semiconductor chip that also comprises individual capacitances per LED (FIG. 7) and/or common capacitances, in series with the LEDs.

Figure 9:
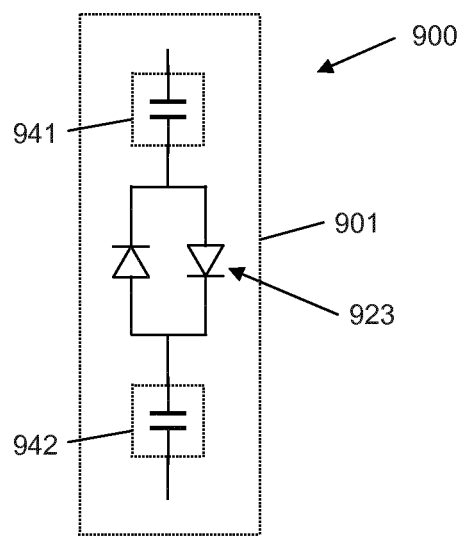
FIG. 9 is a block diagram schematically illustrating a semiconductor building component.

The present invention is also embodied in a semiconductor building component that is particularly suitable for building illumination load devices suitable for being driven capacitively. FIG. 9 is a block diagram schematically illustrating such building component 900. This building component 900 comprises, formed in one common semiconductor substrate 901, an anti-parallel arrangement of two LEDs 923, or a multiplicity thereof. Formed in the same substrate 901, the building component 900 comprises at least one common capacitance in series with said anti-parallel arrangement of LEDs. In the embodiment shown, the arrangement is symmetrical and comprises two common capacitances 941, 942 at opposite sides of the said parallel arrangement of LEDs. It is also possible to have individual serie-capacitances per LED.

Summarizing, the present invention provides a capacitive driving system that comprises:
- a supply device comprising a power generator and capacitive transmission electrodes coupled to said power generator;
- at least one load device comprising two capacitive receiver electrodes and at least one load member coupled to said receiver electrodes.

Either the supply device or the load device, or both, comprise at least one inductor connected in series with at least one of said respective electrodes.

For resonant energy transfer, the supply device and the load device have an energy transfer position in which a first one of said transmission electrodes together with a first one of said receiver electrodes defines a first transfer capacitor while simultaneously a second one of said transmission electrodes together with a second one of said receiver electrodes defines a second transfer capacitor.

At least one auxiliary capacitor is connected in series with the inductor and the load member.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For instance, instead of one inductor being located exclusively in the supply device, it is possible that the supply device comprises two or even more inductors, it is possible that the inductor is or multiple inductors are located in the load device, and it is possible that one or more inductor(s) is/are located in the supply device while simultaneously one or more inductor(s) is/are located in the load device. Since the key of the invention is the presence of at least one series capacitance in either the supply device or the load device, or both, the present invention also relates to a supply device comprising at least one series capacitance but not necessarily comprising an inductor, and the present invention also relates to a load device comprising at least one series capacitance but not necessarily comprising an inductor.

Further, in the embodiments illustrated in FIGS. 8 and 9, an illumination load device comprises two LEDs (or LED strings) arranged anti-parallel. Such anti-parallel arrangement allows for either polarity of the resonant current to flow through one of the two branches. However, to achieve this effect, it is not necessary to have two anti-parallel (strings of) LEDs: it is sufficient to have a first current path for first polarity current and to have a second path for opposite polarity current while at least one of these paths includes at least one LED. The other of said paths does not need to include any LEDs, but may for instance include one or more normal (i.e. non-emissive) diodes or a simple resistor; the device as a whole remains an illumination device, albeit perhaps with less illumination efficiency. Depending on the LED technology used, the second path may even be provided by an internal breakdown voltage of the LED itself, or by an internal protection diode of the LED itself.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Even if certain features are recited in different dependent claims, the present invention also relates to an embodiment comprising these features in common. Any reference signs in the claims should not be construed as limiting the scope.

The invention claimed is:

1. Capacitive driving system, comprising:
   a supply device, the supply device comprising a power generator having two output terminals, at least one set of capacitive transmission electrodes coupled to respective ones of the output terminals;
   at least one load device comprising two capacitive receiver electrodes and at least one load member coupled to said receiver electrodes; wherein at least one of the supply device and the at least one load device comprise at least one inductor connected in series with at least one of said respective electrodes;
   wherein the supply device and the load device have an energy transfer position in which a first one of said transmission electrodes together with a first one of said receiver electrodes defines a first transfer capacitor while simultaneously a second one of said transmission electrodes together with a second one of said receiver electrodes defines a second transfer capacitor; wherein, in the energy transfer position, resonant energy transfer takes place from the supply device to the at least one load member;
   wherein, in a resonant circuit includes the at least one inductor and the at least one load member in the energy transfer position, at least one auxiliary capacitor is connected in series with the at least one inductor and the at least one load member;
   wherein the capacitance value of each one of said transfer capacitors is in a range from $(1-\Delta 1)\cdot C1$ to $(1+\Delta 1)\cdot C1$, in which C1 is indicated as design capacitance of the first and second transfer capacitors and in which $\Delta 1$ is indicated as variation of the first and second transfer capacitors;
   wherein the capacitance value of the auxiliary capacitor is in a range from $(1-\Delta a)\cdot Ca$ to $(1+\Delta a)\cdot Ca$, in which Ca is indicated as design capacitance of the auxiliary capacitor and in which $\Delta a$ is indicated as variation of the auxiliary capacitor;
   and wherein $Ca<C1$ applies and wherein $\Delta a<\Delta 1$ applies.

2. Capacitive driving system according to claim 1, wherein the supply device comprises at least one inductor connected in series between the power generator and at least one of said transmission electrodes.

3. Capacitive supply device adapted for a capacitive driving system according to claim 1, comprising the power generator having two output terminals, the at least one set of capacitive transmission electrodes coupled to respective ones of the output terminals and the at least one auxiliary capacitor connected in series with at least one of said transmission electrodes;
   said transmission electrodes designed and suited for capacitive coupling with two capacitive receiver electrodes of the load device adapted for the capacitive driving system, the coupled transmission and receiver electrodes defining transfer capacitors;
   the supply device preferably further comprising the at least one inductor connected in series between the power generator and at least one of said transmission electrodes;
   wherein the capacitance value of each one of said transfer capacitors is in the range from $(1-\Delta 1)\cdot C1$ to $(1+\Delta 1)\cdot C1$, in which C1 is indicated as design capacitance of the transfer capacitors and in which $\Delta 1$ is indicated as variation of the first and second transfer capacitors;
   wherein the capacitance value of the auxiliary capacitor is in a range from $(1-\Delta a)\cdot Ca$ to $(1+\Delta a)\cdot Ca$, in which Ca is indicated as design capacitance of the auxiliary capacitor and in which $\Delta a$ is indicated as variation of the auxiliary capacitor;
   and wherein $Ca<C1$ applies and wherein $\Delta a<\Delta 1$ applies.

4. Capacitive supply device according to claim 3, comprising an additional set of capacitive transmission electrodes coupled to said output terminals, further comprising respective auxiliary capacitors connected in series with the respective transmission electrodes.

5. Capacitive supply device according to claim 1, wherein the at least one set of capacitive transmission electrodes are at least two relatively large-surface capacitive transmission electrodes coupled to said output terminals designed and suited for capacitive coupling with capacitive receiver electrodes of a plurality of load devices that further each comprise at least one load member coupled to said receiver electrodes;

the supply device further comprising at least one auxiliary capacitor connected in series with a respective transmission electrode.

6. Capacitive load device adapted for the capacitive driving system according to claim 1, comprising the two capacitive receiver electrodes, the at least one load member coupled to said receiver electrodes and the at least one auxiliary capacitor connected in series with the load member and/or connected in series with at least one of said receiver electrodes;

wherein said receiver electrodes are designed and suited for capacitive coupling with two capacitive transmission electrodes of a supply device adapted for the capacitive driving system, the coupled transmission and receiver electrodes defining transfer capacitors, and preferably at least one inductor connected in series between the power generator and at least one of said transmission electrodes;

wherein the capacitance value of each one of said transfer capacitors is in a range from $(1-\Delta 1) \cdot C1$ to $(1+\Delta 1) \cdot C1$, in which C1 is indicated as design capacitance of the transfer capacitors and in which $\Delta 1$ is indicated as variation of the transfer capacitors;

wherein the capacitance value of the auxiliary capacitor is in a range from $(1-\Delta a) \cdot Ca$ to $(1+\Delta a) \cdot Ca$, in which Ca is indicated as design capacitance of the auxiliary capacitor and in which $\Delta a$ is indicated as variation of the auxiliary capacitor and wherein Ca<C1 applies and wherein $\Delta a<\Delta 1$ applies.

7. Capacitive load device according to claim 6, comprising two auxiliary capacitors connected in series at opposite ends of the load member.

8. Capacitive load device according to claim 6, comprising a parallel arrangement of at least two load members and one common auxiliary capacitor connected in series with said parallel arrangement.

9. Capacitive load device according to claim 6, comprising a parallel arrangement of at least two load members and two auxiliary capacitor connected in series at opposite ends of said parallel arrangement.

10. Capacitive load device according to claim 6, comprising a parallel arrangement of at least two load members and respective individual auxiliary capacitor connected in series with respective ones of said load members.

11. Capacitive load device according to claim 8, wherein the load device is an illumination load device and at least one of said two load members comprises a string of at least one first LED, while the other one of said two load members is at least electrically conductive in the opposite direction as compared to the forward direction of said at least one first LED, said other one of said two load members preferably comprising a string of at least one LED arranged antiparallel to said at least one first LED.

12. Semiconductor building component adapted for a capacitive driving system according to claim 1, comprising a common semiconductor substrate, at least one anti-parallel arrangement of strings of one or more LEDs formed in said semiconductor substrate, and the at least one auxiliary capacitor formed in said semiconductor substrate and connected in series with said anti-parallel arrangement of LEDs, or connected in series with respective ones of said LED strings.

* * * * *